United States Patent [19]
Anderson

[11] Patent Number: 5,887,549
[45] Date of Patent: Mar. 30, 1999

[54] CATTLE STANCHION

[75] Inventor: Bernard O. Anderson, Glendale, Ariz.

[73] Assignee: Nielsen Industries, Inc., Phoenix, Ariz.

[21] Appl. No.: 83,725

[22] Filed: May 22, 1998

Related U.S. Application Data

[60] Provisional application No. 60/047,754, May 27, 1997.

[51] Int. Cl.⁶ .................................................. A01K 15/04
[52] U.S. Cl. ........................... 119/743; 119/745; 119/746
[58] Field of Search ................................... 119/738, 739,
119/740, 741, 742, 743, 746, 745

[56] References Cited

U.S. PATENT DOCUMENTS

| | | |
|---|---|---|
| 1,234,044 | 7/1917 | Kugler . |
| 1,464,159 | 8/1923 | Troth . |
| 3,863,604 | 2/1975 | Nielsen et al. .......................... 119/741 |
| 4,457,265 | 7/1984 | Anderson ................................ 119/750 |
| 5,226,387 | 7/1993 | Anderson ................................ 119/742 |
| 5,564,368 | 10/1996 | Hepp et al. ............................. 119/740 |
| 5,694,887 | 12/1997 | Vandenberg ............................ 119/740 |

*Primary Examiner*—Michael J. Carone
*Assistant Examiner*—J. S. Bergin
*Attorney, Agent, or Firm*—Charles E. Cates

[57] ABSTRACT

A cattle stanchion has a frame supporting animal restraint mechanism which includes an enclosed latching and release mechanism and an enclosed lockout means capable of operating in various positions. The frame is comprised of relatively thin welded section materials providing strength and rigidity while retaining light weight. The animal restraint mechanism is comprised of a support bar attached to the frame and a rocker arm pivotally mounted on the support bar. The enclosed latching and release mechanism is mounted on the top of the frame and cooperates with the rocker arm to perform the cattle stanchion's free feed, self-catch, single release, and group release functions. The stanchion's lock-out function is performed by the lock-out means.

7 Claims, 18 Drawing Sheets

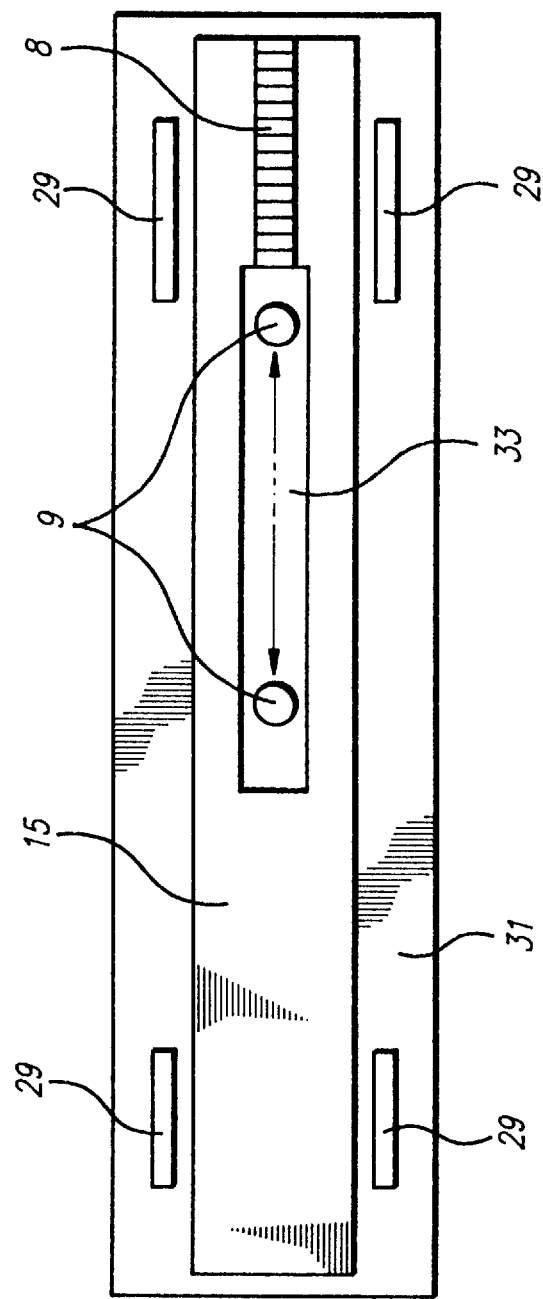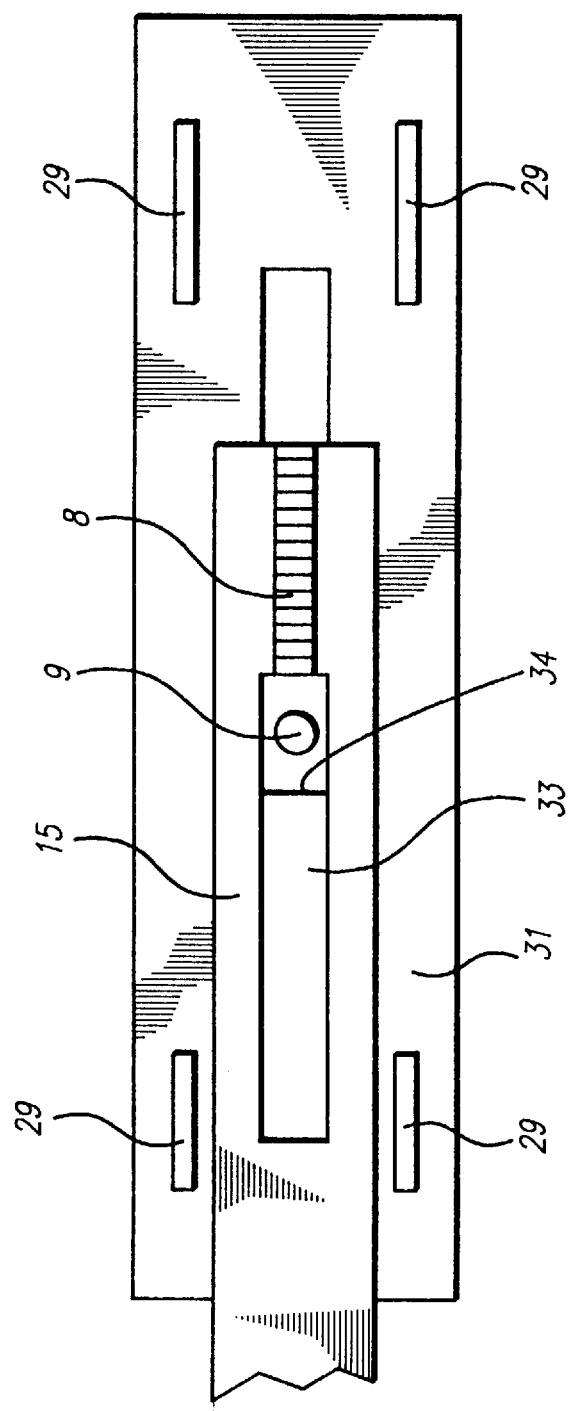

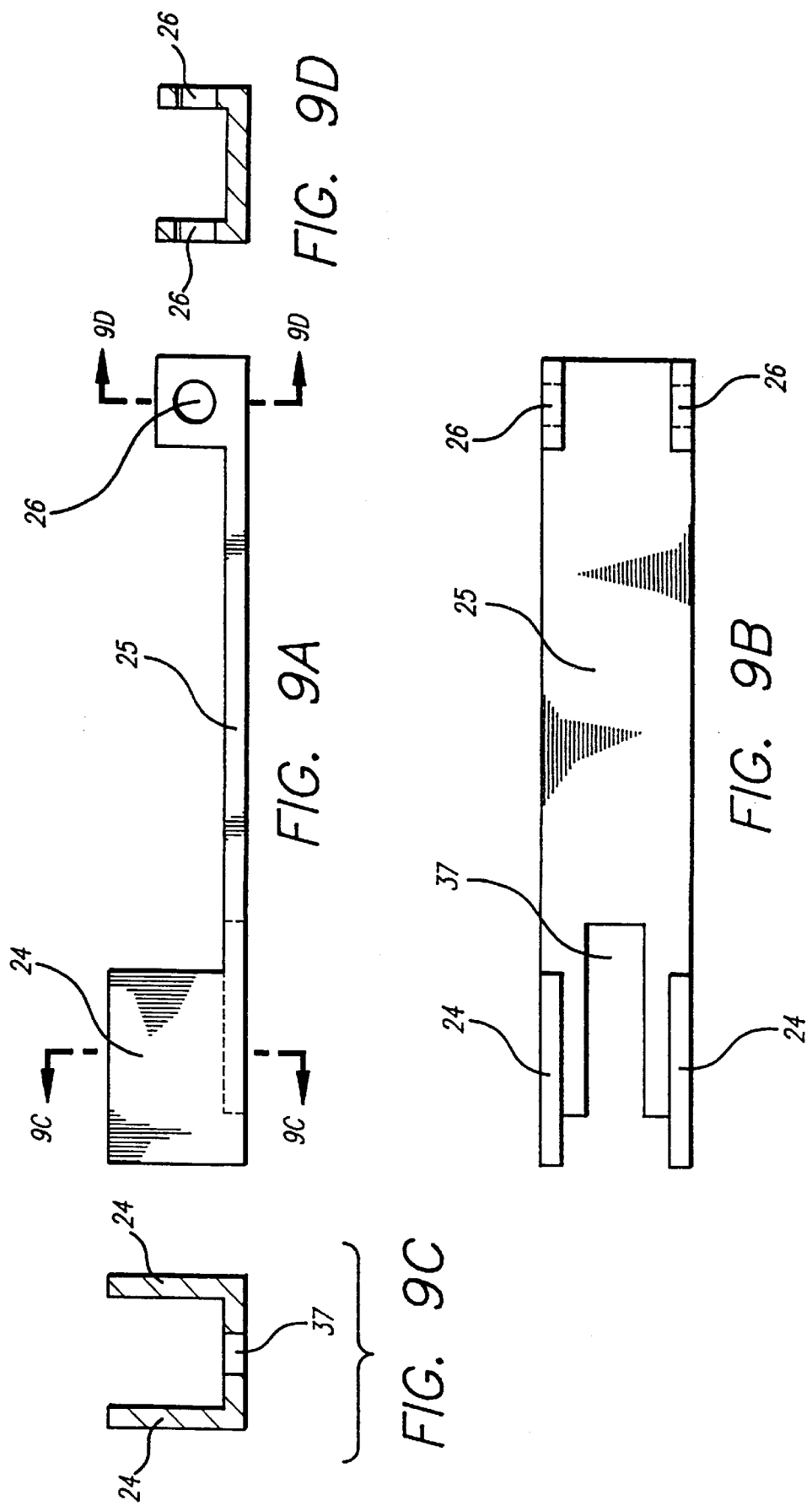

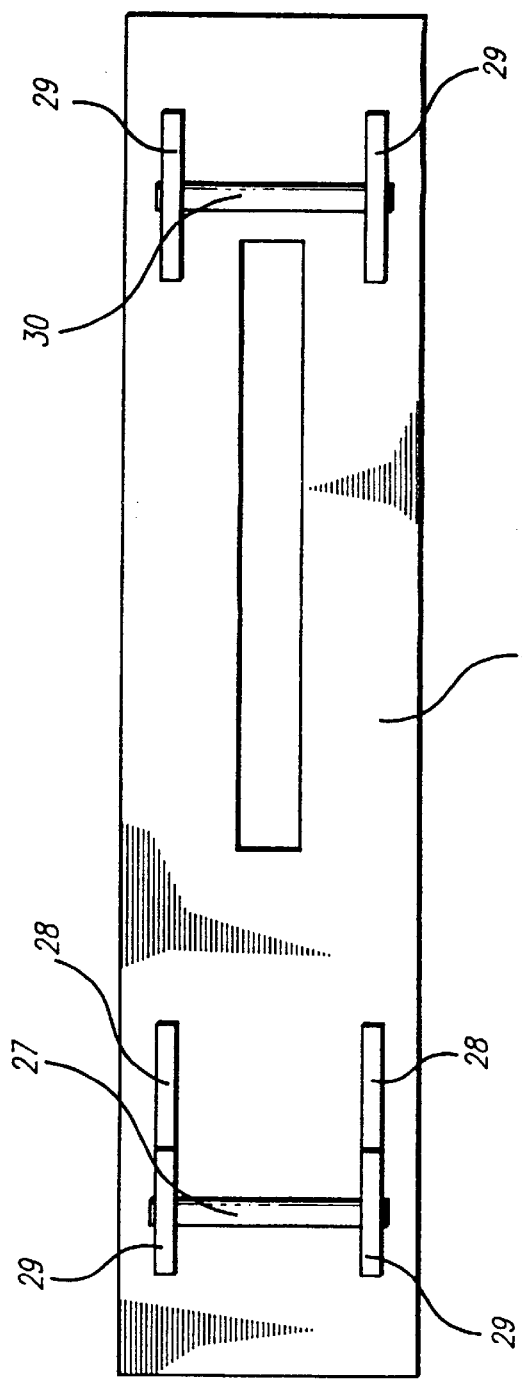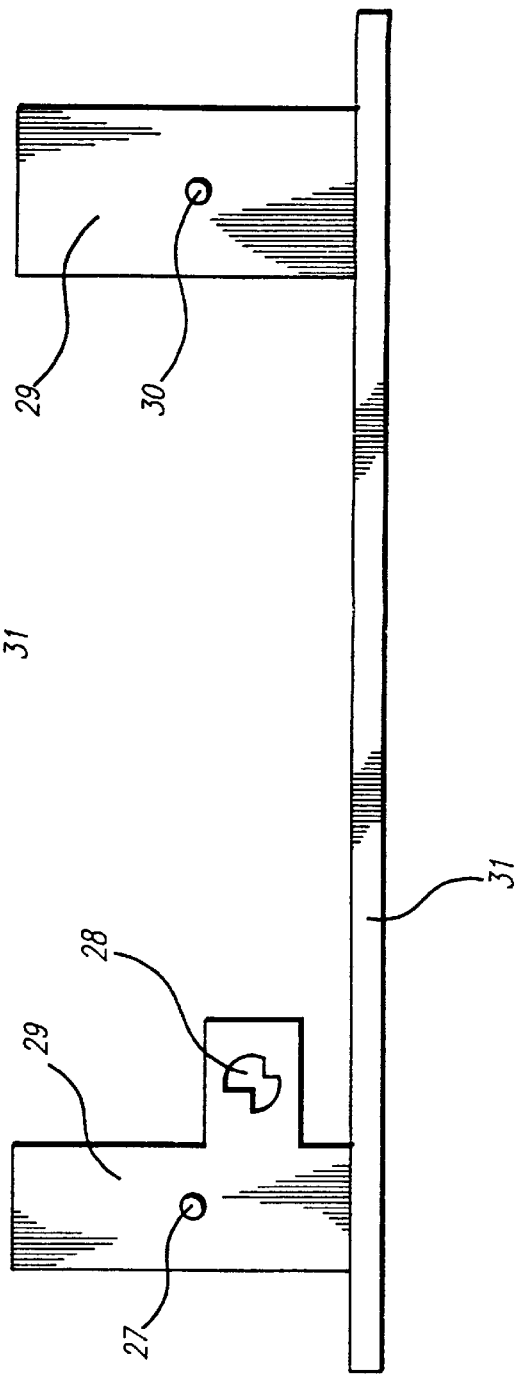

CATTLE STANCHION

This application relies upon previously filed copending Provisional Application, Ser. No. 60/047,754, filed May 27, 1997, for priority under 35 U.S.C. 119(e).

BACKGROUND OF THE INVENTION

This invention relates to a latching and release mechanism for cattle stanchions, more particularly to such stanchions that are self-latching, self, or group, releasing and/or locking in either an open or closed position and it is an object of the invention to provide an improved apparatus of this nature.

Cattle stanchions for holding and releasing cows during milking, feeding, and/or veterinary treating are well-known and exist in many varieties. The goal in improvements of these devices and their systems is to make an apparatus that is relatively easy to maintain and operate, and that permits the cattle to trap themselves. Also, an operator must be able to release the cattle individually or as a group.

For prior art devices of this nature, see patents to Albers, U.S. Pat. No. 4,185,592, Albers U.S. Pat. No. 4,185,592, Anderson U.S. Pat. No. 5,226,387, and particularly to Anderson U.S. Pat. No. 4,457,265. In each of the Albers patents there is disclosed a fixed stanchion arrangement involving a fixed stanchion and a release stanchion which includes latching or locking mechanism carried on its upper end.

The Anderson U.S. Pat. No. 4,185,592 provides an improved self-catch or latch stanchion operated in part by gravity and in which the opening and closing operating mechanism is independent of the latch/release mechanism. Also, a manual release mechanism is provided so that a cow may be released under the circumstances where the cow has fallen and needs to be released separately. Also see the following U.S. Pat. No. 737,884 (Thompson), U.S. Pat. No. 4,051,813 (Albers), U.S. Pat. No. 4,037,566 (Albers), U.S. Pat. No. 4,185,592 (Albers Sr.), U.S. Pat. No. 4,476,815 (Albers, Sr.), U.S. Pat. No. 4,495,897 (Albers, Sr.), U.S. Pat. No. 3,863,604 (Neilsen et al), U.S. Pat. No. 4,867,105 (Hatfield), U.S. Pat. No. 5,373,813 (DaSilveira).

BRIEF SUMMARY OF THE INVENTION

The primary object of the invention is to provide an improved cattle stanchion having an enclosed latching and release mechanism and an enclosed lockout means with a frame whose basic elements are a horizontal top enclosure having upper and lower inner portions, horizontal bottom frame means, and vertical brace means connecting the horizontal top enclosure and the horizontal bottom frame means. A major disadvantage in the prior art is the fact that the latching and release mechanisms are located on the exterior of the cattle stanchion exposed to the weather. In this exposed condition, the prior art's latching and release mechanisms are susceptible to freezing rain and snow which can inhibit the operation of the mechanism. An object of this invention is to overcome this defect by enclosing the latching and release mechanism within an enclosure.

The frame carries an animal restraint mechanism which comprises: a support bar having upper and lower ends which are attached to the horizontal top enclosure and horizontal bottom frame means of the frame respectively, a rocker arm having upper and lower ends, and mounting means for pivotally mounting the rocker arm on the support bar. The rocker arm and the vertical brace means define a space through which an animal can insert its head.

The latching and release mechanism is enclosed within the horizontal top enclosure of the frame. The latching and release mechanism cooperates with the upper end of the rocker arm for performing some of the cattle stanchion's various functions. In carrying out the invention according to one form, the latching and release mechanism is comprised of: a top rail being horizontally slidable in the upper inner portion of the horizontal top enclosure, the top rail having a latch pin slot, a latch pin being slidably movable in the latch pin slot in the top rail, and operating means for moving the latch pin within the latch pin slot in the top rail.

An animal will place its head within the space defined by the rocker arm and the vertical brace means. The animal's head will engage the lower end of the rocker arm pivoting the rocker arm. As the rocker arm pivots, the upper portion of the rocker arm comes into engagement with the latching and release mechanism, trapping the rocker arm in a fixed position. With the rocker arm trapped in a fixed position, the animals head is trapped within the cattle stanchion. The animal can be released by two methods. In the first method, the operating means for moving the latch pin can be used to move the latch pin, release the rocker arm from its fixed position, and free the animal. This method is the single release function. In the second method, means for sliding the top rail can be used to move the top rail containing the latch pin away from the rocker arm such that the rocker arm is no longer trapped in a fixed position. The rocker arm can then pivot freely and the animal can pull its head out of the stanchion. This method is the group release function. When the top rail is moved into a position such that the rocker arm does not engage the latch pin and cannot become trapped, the stanchion is then in the free feed position. By returning the top rail to a position where the upper portion of the rocker can engage the latch pin and become trapped, an animal can place its head within the defined space and trap itself. This operating is the self-catch function.

A further defect in the prior art is the fact that the lockout means are also on the exterior of the cattle stanchion exposed to the weather. In this exposed condition, the prior art's lockout means is susceptible to freezing rain and snow which can inhibit the operation of the lockout means. A further object of this invention is to overcome this defect by enclosing the lockout means within an enclosure.

The enclosed lockout means is comprised of a lockout rail enclosed within the lower inner portion of the horizontal top enclosure and means for slidably moving the lockout rail within the horizontal top enclosure. By slidably moving the lockout rail by means for sliding the lockout rail, a notch within the lockout rail engages the rocker arm, pulling it into a fixed vertical position. When the rocker arm is in a fixed vertical position, animals cannot place their heads within the defined space to become trapped. In this position, the animals are locked-out.

The cattle stanchion system is intended to take the form of a long row of cattle stanchion sections, joined by the horizontal top enclosure and the horizontal bottom frame means, wherein the sliding means for operating the top rail operates all of the stanchion sections in unison. Further, the sliding means for operating the lockout rail operates all of the stanchion sections in unison.

An additional defect in the prior art lies in the design and operation of the latching and release mechanism in the single release function. Due to many causes, a cow can become frightened and require individual releasing from the row of stanchions with the other cows remaining locked in. A person would therefore try to operate the single release function on the stanchion to set the cow free. However, in a frightened state, the cow can jam and prevent the mechanical operation of the single release devices in the prior art. An operator therefore has to wait until the cow relaxes and no longer jams the single release device in order to release the cow individually. This invention overcomes this defect through an improved latching and release mechanism. In the invention, an operator does not have to remain at the stanchion until the frightened cow relaxes to release the cow. With this invention, the operator can set an individual stanchion to single release which is then mechanically triggered automatically once the frightened cow relaxes. The invention is comprised of a latch operator, a latch operator axle, and a latch rotator. The latch operator is comprised of means for mounting the latch operator to the latch operator axle, two side portions for engaging the latch pin, and a thin metal strip connecting the means for mounting the latch operator and the two side portions. When a cow is frightened and presses its neck against the rocker arm, the latch pin is mechanically trapped in the latch pin slot thus preventing the cow from being released. To operate this single release trap function when a cow is frightened, an operator will rotate the means for pivoting the latch operator into the single release position. The means for pivoting the latch operator engages the thin metal strip of the latch operator. The thin metal strip is fixed at its first end to the latch operator axle. The two side portions of the latch operator are held in a fixed position by the mechanically trapped latch pin thus holding the second end of the thin metal strip of the latch operator in a fixed position. When the latch rotator engages the thin metal strip it pushes the thin metal strip's center portion up creating a moment against the latch pin through the two side portions. Once the cow is no longer frightened and ceases to press its neck against the latch pin, the latch pin is no longer mechanically trapped in the latch pin slot and is raised to a release position by the loaded latch operator. This function is called the single release trap function.

A further improvement over the prior art lies in the fact that this invention includes weather proofing means to protect the latch operator and the latch rotator. The single release devices in the prior art lay exposed on the outside of the stanchion to snow and freezing rain which can inhibit their operation. This invention overcomes that defect by enclosing the latch operator and means for pivoting the latch operator within an enclosure. The means for pivoting the latch operator, which can be accessed from outside the enclosure for human operation, is further protected by a circular weather guard. The means for pivoting the latch operator is comprised of a handle, a flat shaft, a shaft holder, and a latch operator engager. The circular weather guard is fixed between the handle which is exposed to the outside for human operation and the flat shaft, shaft holder, and latch operator engager which are contained within the enclosure. The circular weather guard operates to block any freezing rain or snow from entering the device and hindering the mechanical operation of the internal components.

DESCRIPTION OF THE DRAWINGS

For a better understanding of the invention, reference should now be had to the accompanying drawings in which:

FIG. 2 shows the device in the catch position.

FIG. 3 shows the rotation of the rocker arm and functioning of the catch and release mechanism once it has been engaged by an animal.

FIG. 4 shows the position of the rocker arm after full rotation caught behind the latch pin 1.

FIG. 7A shows the lock-out rail in free feed position.

FIG. 7B shows the lock-out rail in the lock-out position.

FIG. 9A shows a side view of the latch operator.

FIG. 9B shows a top view of the latch operator.

FIG. 9C shows a section view of the latch operator taken along the lines 9C—9C of FIG. 9A.

FIG. 9D shows a section view of the latch operator taken along the lines 9D—9D of FIG. 9A.

FIG. 10A shows a top view of the enclosure support device.

FIG. 10B shows a side view of the enclosure support device.

DETAILED DESCRIPTION OF THE INVENTION

Figure 1:
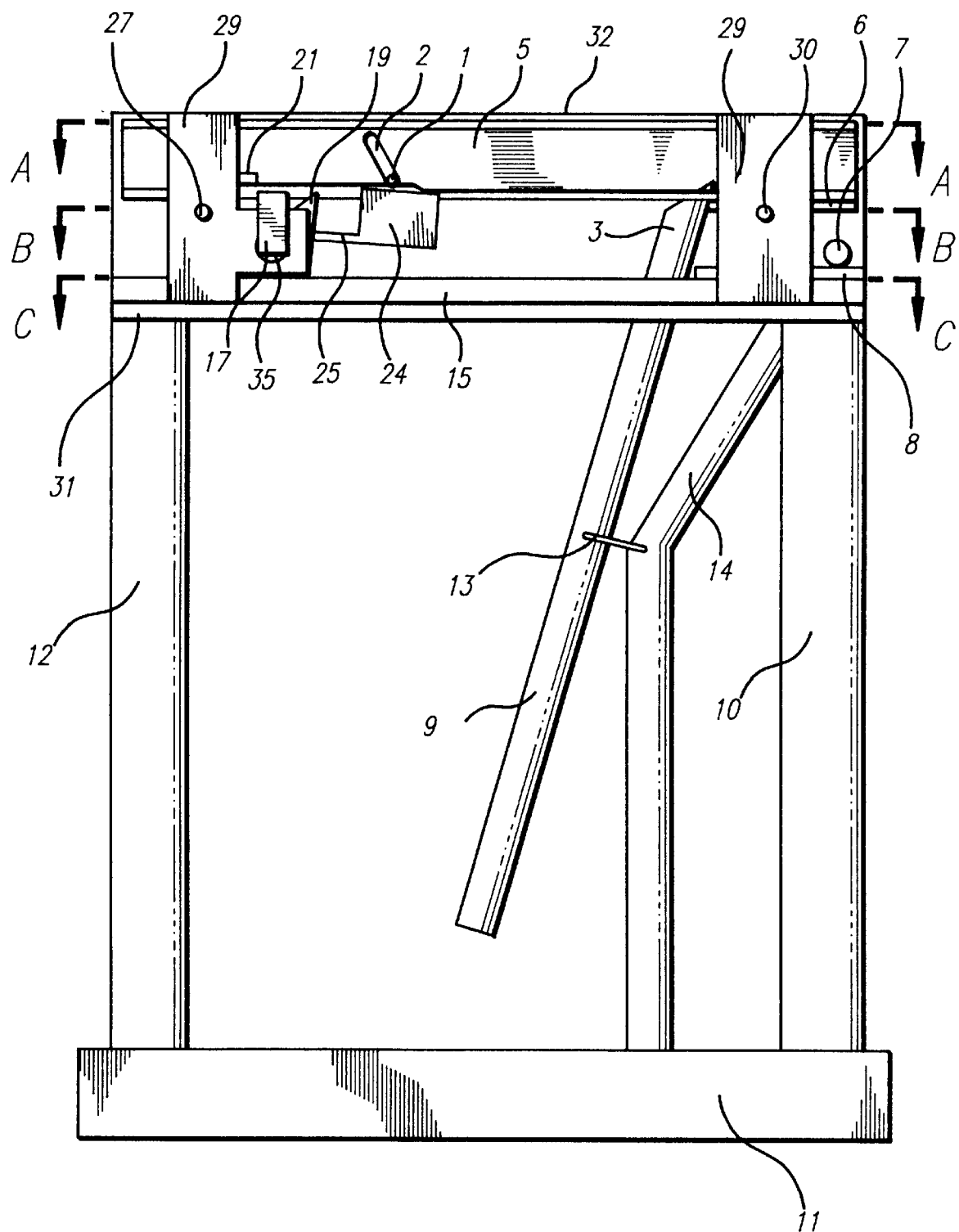
FIG. 1 shows a side view of the invention. The side of the horizontal top enclosure 32, has been removed to reveal the operational components of the latching and release mechanism.

Referring to the drawings, wherein a presently preferred embodiment of the invention is shown, a single stanchion is shown for a single animal, e.g., cow or calf. The single section shown in FIG. 1 is, of course, exemplary, inasmuch as a plurality of sections may be joined to form a row of stanchions joined at the horizontal bottom frame means 11 and the horizontal top enclosure 32.

FRAME AND ASSOCIATED COMPONENTS

Referring to FIG. 1, the stanchion apparatus includes a frame comprising: a horizontal top enclosure 32, a horizontal bottom frame means 11, and vertical brace means 10 and 12. These components are made of relatively thin section materials providing strength and rigidity while retaining light weight. The frame components are attached to each other forming a rigid frame.

Also shown in FIG. 1 is the animal restraint mechanism comprising: a rocker arm 9, a support bar 14, and means for pivotally mounting the rocker arm on the support bar 13. The support bar is connected at its upper end to the horizontal top enclosure 32 and the left vertical brace means 12. The support bar is then connected at its lower end to the horizontal bottom frame means 11. The rocker arm 9 and the left vertical brace means 12 define a space through which an animal can insert its head.

Also shown in FIG. 1 is one preferred embodiment of the latching and release mechanism comprising: a latch pin 1, a top rail 5 having a latch pin slot 2, a latch operator connector 25 and vertical side portions 24, a top rail rack 6, and a pinion gear 7. The upper portion 3 of the rocker arm 9 is angled to enable it to engage the latch pin 1 and move it in a vertical direction within the latch pin slot 2. The latch operator, comprised of the connector 25 and vertical side portions 24, is pivotally mounted to the latch operator axle 27. The pinion gear 7 is vertically movable within the horizontal top enclosure and can engage the top rail rack 6 to slidably move the top rail 5, or to engage the lockout rail rack 8 to slidably move the lockout rail 15. The top rail is supported in the upper inner portion of the horizontal top enclosure by the latch operator axle 27 and the top rail support rod 30. The top rail vertical support 29 also supports the pivoting means for rotating the latch operator which is comprised of the handle 17, the shaft 18, circular weather guard 35, and the latch operator engager 19. The shaft 18, is rotatably contained within the shaft support 28 shown in FIGS. 10A and 10B. The latch operator engager 19 engages the center portion of the connector 25 which is connected to the vertical side portions 24 of the latch operator. By rotating the handle 17 which is fixed to the shaft 18, the latch operator engager 19 which is fixed to the shaft 18 rotates thereby engaging the connector 25 and raising the vertical side portions 24. The vertical side portions 24 engage and raise the latch pin 1 within the latch pin slot 2 to perform the single release function described below in FIG. 3. The latch operator axle 27 and top rail support rod 30 are supported by the top rail vertical supports 29. The latch pin 1 has a thicker inner portion and a thinner outer portion to ensure that it remains slidably trapped within the latch pin slot 2. The connector 25 has a slot 37 for receiving the upper portion of the rocker arm 9 and vertical sides for engaging the latch pin 1.

Figure 14:
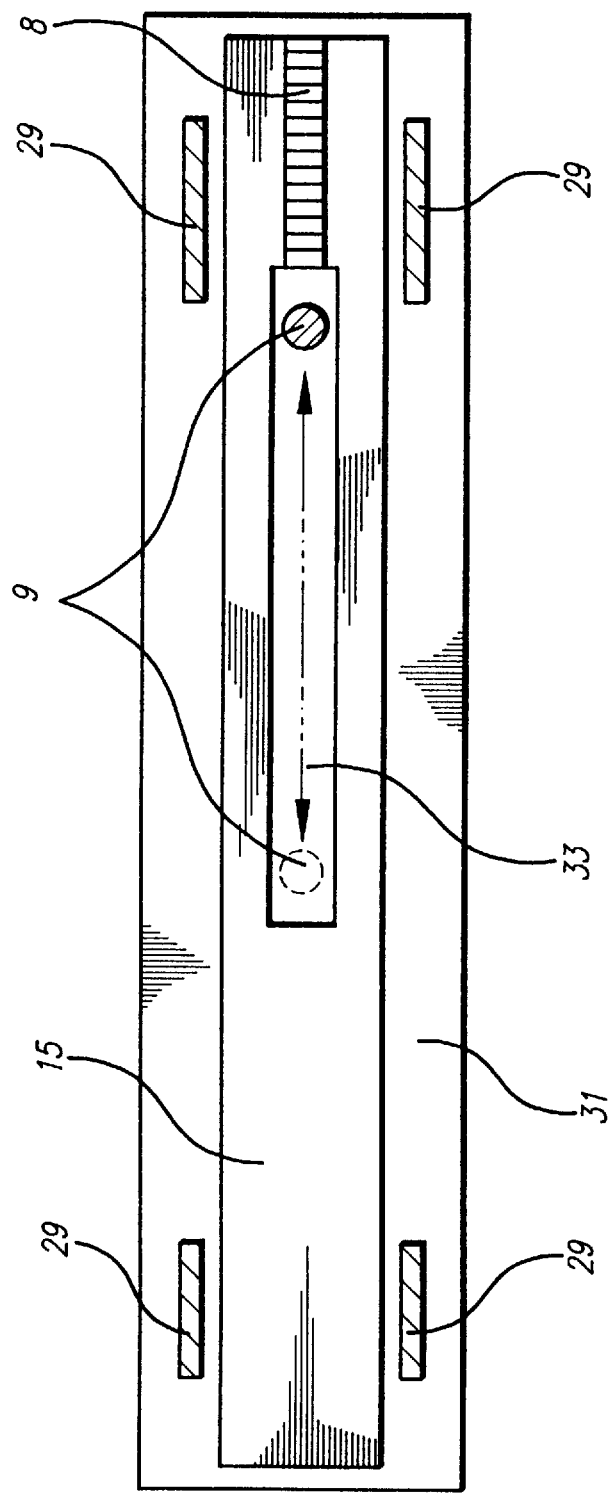
FIG. 14 shows cross section C of the horizontal top enclosure shown in FIG. 1.

The lock-out means, also shown in FIGS. 7A and 7B, comprises a lock-out rail 15 and a lock-out rail rack 8. The lock-out rail 15 contains a notch 33 to permit the free rotation of the rocker arm 9 as shown in FIG. 14.

Figure 2:
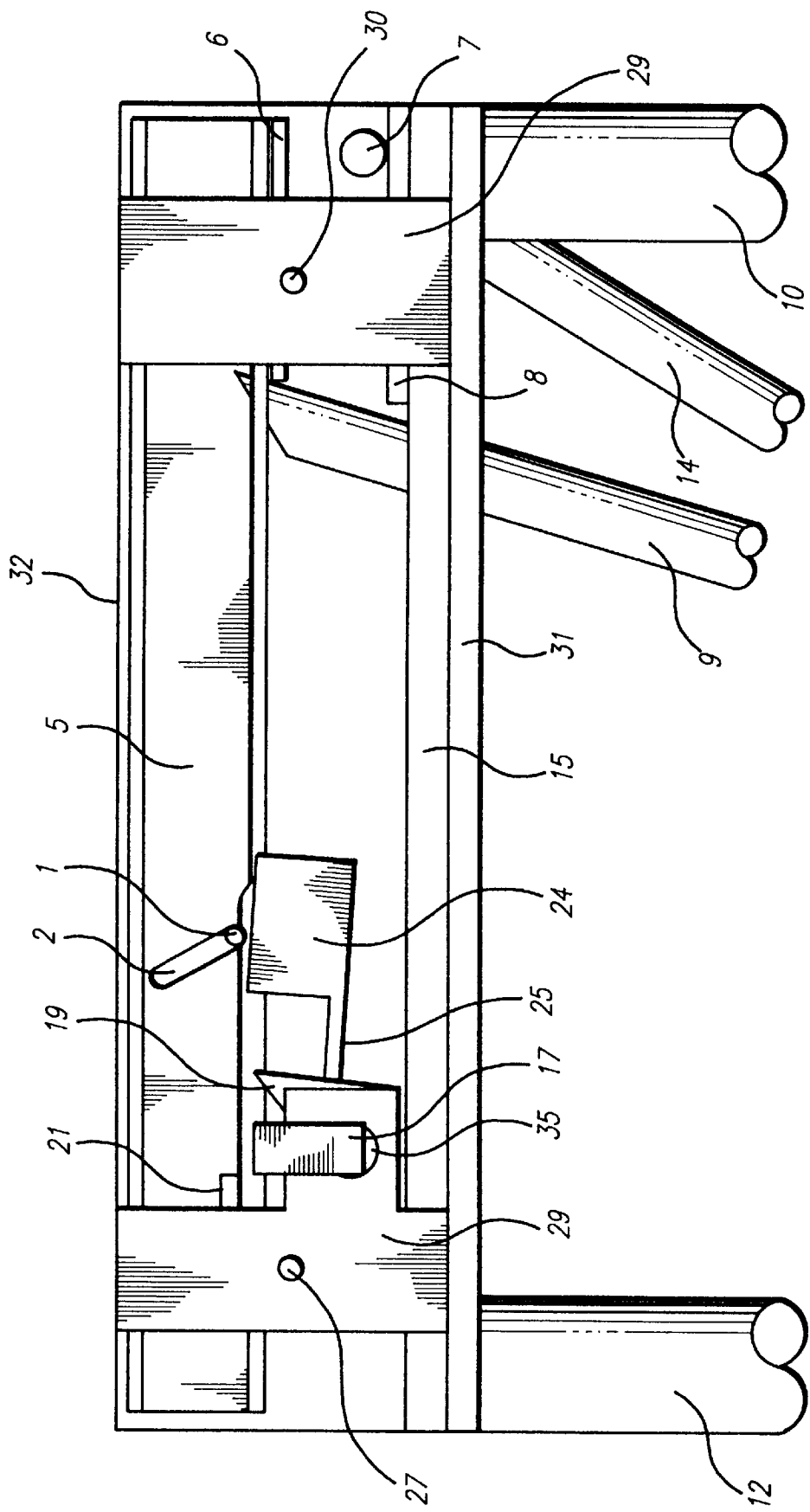
FIGS. 2, 3, and 4 show the functioning of the invention in the self catch function.
Figure 3:
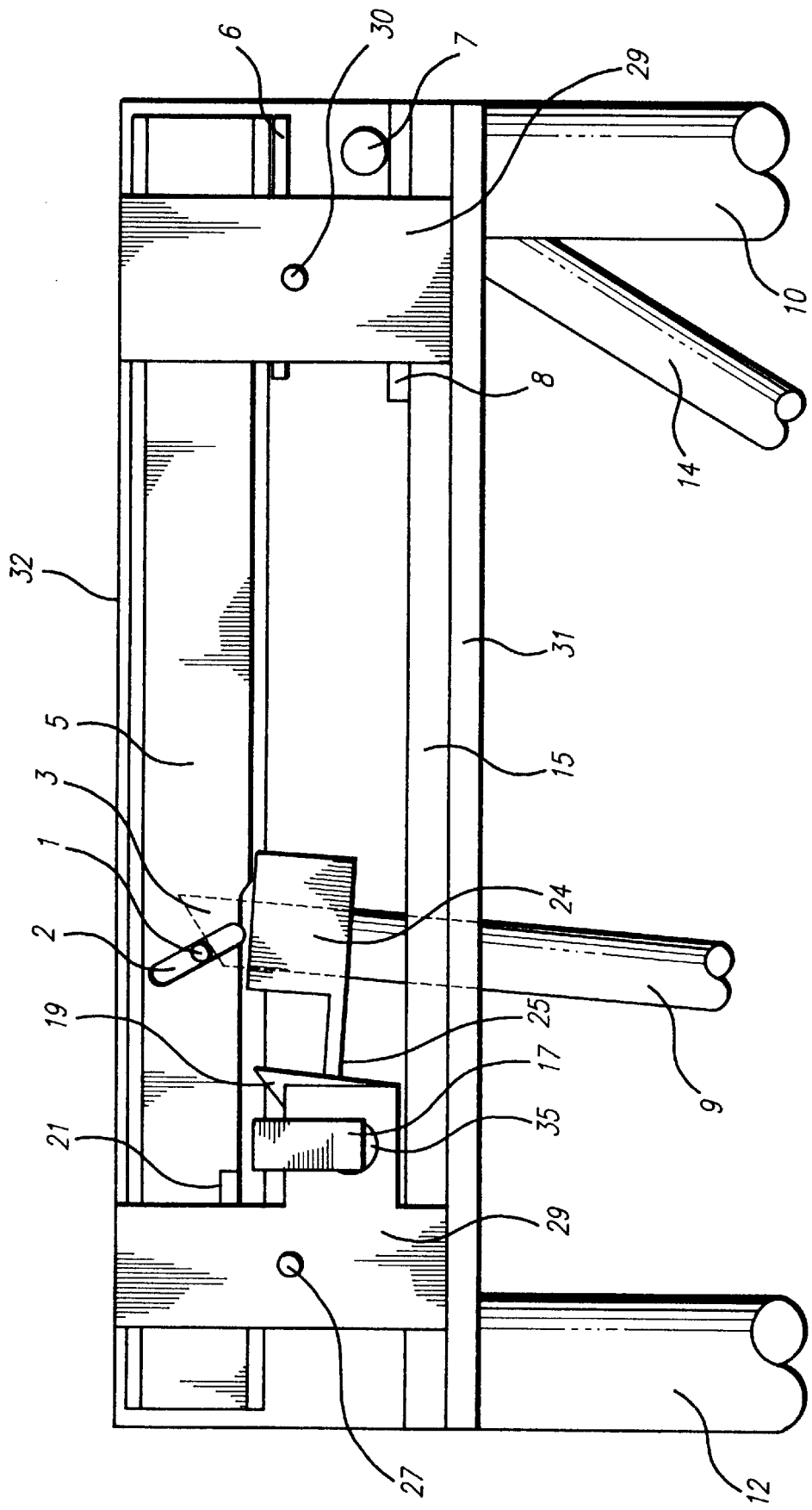
Figure 4:
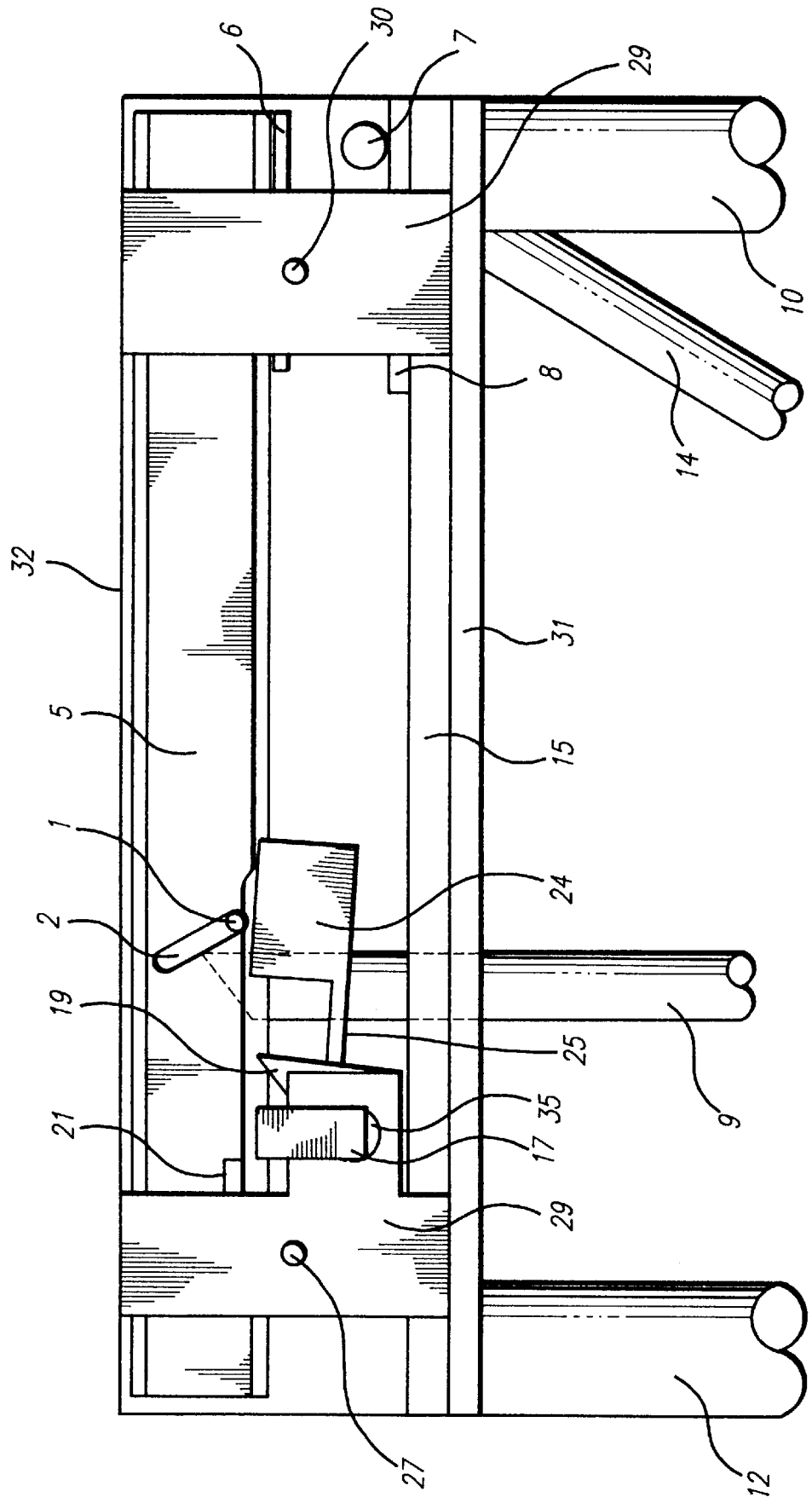

FIGS. 2, 3, and 4 show the self-catch function. Referring to FIG. 2, the stanchion is shown in the catch position. In this position the latch pin 1, latch pin slot 2, and the latch operator connector comprise a latch to engage and trap the rocker arm 9. The lock-out rail 15 is positioned such that the rocker arm 9 can rotate freely within the notch in the lock-out rail 15. Referring to FIG. 3, the rocker arm 9 pivots on means for pivotally mounting the rocker arm on the support bar 13 shown in FIG. 1 in a clockwise motion, the angled top surface of the upper portion 3 of the rocker arm 9 engages the latch pin 1 moving said latch pin 1 in a vertical direction within the latch pin slot 2. The angled top surface of the upper portion 3 of the rocker arm 9 raises the latch pin 1 to the top of the latch pin slot 2 such that the rocker arm 9 may rotate past the latch pin 1. As shown in FIG. 4, once the rocker arm 9 has pivoted past the latch pin 1, gravity pulls the latch pin 1 down trapping the rocker arm 9 in a fixed position between the latch pin 1 and the latch operator connector 25.

Figure 5:
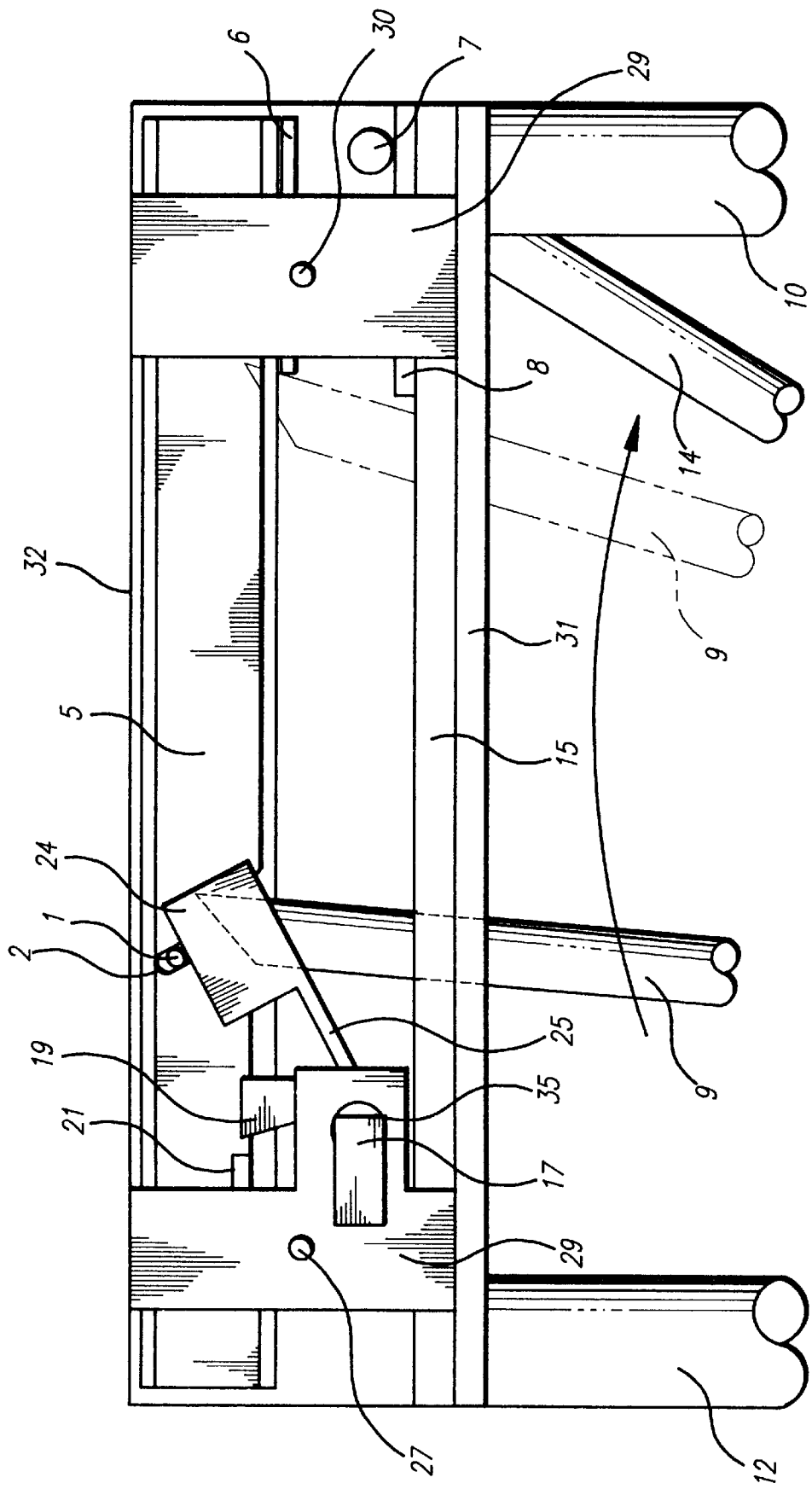
FIG. 5 shows the single release function of the invention.

FIG. 5 shows the single release function of releasing the rocker arm 9. The rocker arm 9 is caught in a fixed position between the latch pin 1 and the slot in the connector 25 such that it cannot rotate. An attendant (not shown), rotates the handle 17, rotating the latch operator engager 19, engaging the latch operator connector 25. The rising vertical side portions 24 raise the latch pin 1. When the latch pin 1 is raised to the top of the latch pin slot 2, the rocker arm 9 can pivot in a counter-clockwise direction without being obstructed by said latch pin 1. Once rocker arm 9 passes underneath the latch pin 1, the rocker arm 9 continues to rotate in a counter clockwise direction back to the catch position.

Figure 6:
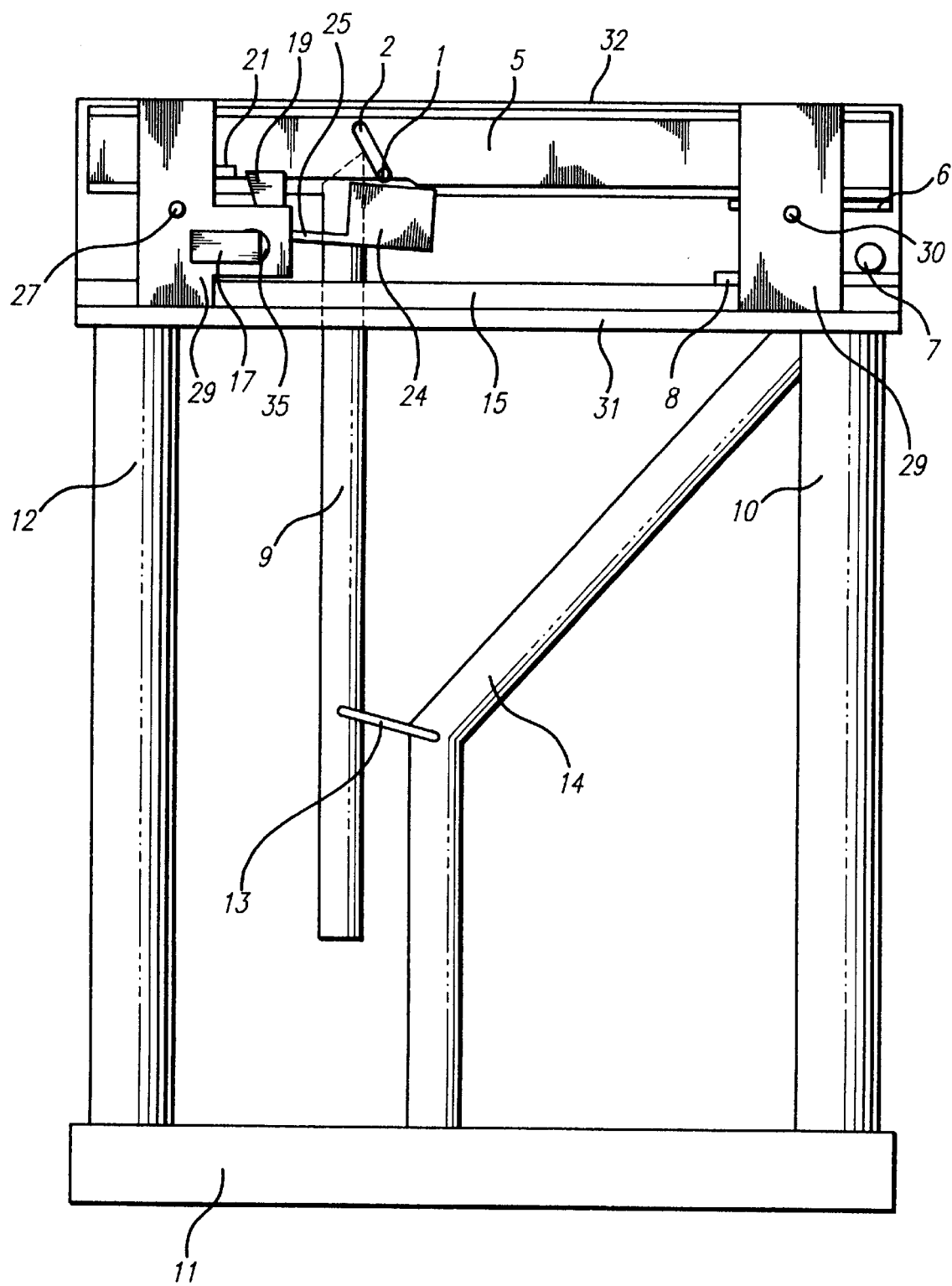
FIG. 6 shows the trap delayed release function of the invention.

FIG. 6 shows the operation of single release trap function. The latch operator, shown in FIGS. 9A, 9B, 9C, and 9D is comprised of means for mounting the latch operator to the latch operator axle 27, two side portions 24 for engaging the latch pin, and a thin metal strip, latch operator connector 25 connecting the means for mounting the latch operator and the two side portions. There is a slot 37 to permit the free movement of the rocker arm 9. When a cow is frightened and presses its neck against the rocker arm 9, the latch pin 1 is mechanically trapped in the latch pin slot 2 by the rocker arm 9 thus preventing the cow from being released. To operate this single release trap function when a cow is frightened, an operator will rotate the handle 17 of the latch rotator into the single release position. Rotating the handle 17 rotates the latch operator engager 19. The latch operator engager engages the latch operator connector 25 of the latch operator. The latch operator connector 25 is fixed at its first end to the latch operator axle 27. The two side portions 24 of the latch operator are held in a fixed position by the mechanically trapped latch pin 1 thus holding the second end of the latch operator connector 25 of the latch operator in a fixed position. When the latch operator engager 19 engages the latch operator connector 25 it pushes the connector's center portion up creating a moment against the latch pin 1 through the two side portions 24. Once the cow is no longer frightened and ceases to press its neck against the rocker arm 9, the latch pin 1 is no longer mechanically trapped in the latch pin slot 2 and is raised to a release position by the vertical side portions 24 of the latch operator as shown in FIG. 5. The rocker arm is then free to rotate back to the catch position.

FIGS. 7A and 7B shows the operation of the lock-out rail. In FIG. 7A, the notch 33 in the lock-out rail 15 is in the free feed position where the rocker arm 9 can rotate unobstructed by the notch 33. In FIG. 7B, the lock-out rail 15 has been moved into lock-out position. In this position the right end of the notch 33 in the lock-out rail 15 engages the rocker arm 9 pulling it to the right and trapping it against the slot 34 in the base of the top horizontal enclosure 31. In this position the rocker arm 9 cannot rotate and is "locked out." The lock-out rail reciprocates between the lock-out and free-feed positions through action by the lock-out rail rack 8 and the pinion gear 7 shown in FIG. 1.

Figure 8B:
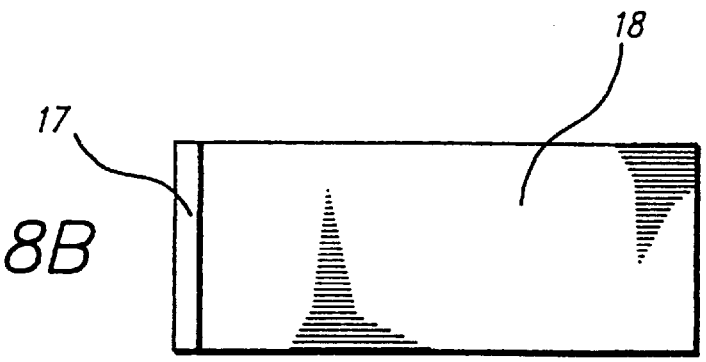
FIG. 8B shows a side view of the handle of the means for rotating the latch operator.
Figure 8A:
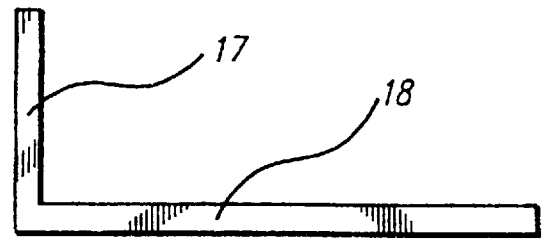
FIG. 8A shows a top view of the handle of the means for rotating the latch operator.
Figure 8C:
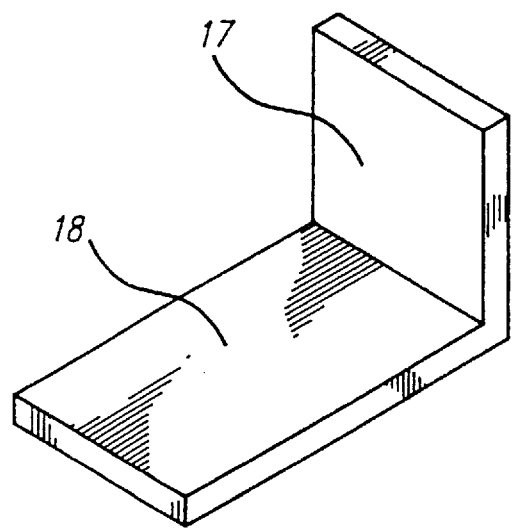
FIG. 8C shows an isometric view of the handle of the means for rotating the latch operator.

FIGS. 8A, 8B, and 8C show the handle component of the means for pivoting the latch operator consisting of a handle 17 and a shaft 18.

FIGS. 9A, 9B, 9C, and 9D show the latch operator. The latch operator consists of vertical side portions 24 which engage the latch pin 1 and a thin flat metal portion referred to as the connector 25. Holes 26 are where the latch operator pivotally attaches to the latch operator axle 27. The slot 37 permits the free rotation of the rocker arm 9.

FIGS. 10A and 10B show the enclosure support device. This device is the support structure for the components within the horizontal top enclosure 32. The enclosure support device consists of four vertical support 29, a latch operator axle 27, a top rail support rod 30, a horizontal top enclosure base 31 and a latch operator shaft support 28.

Figure 11B:
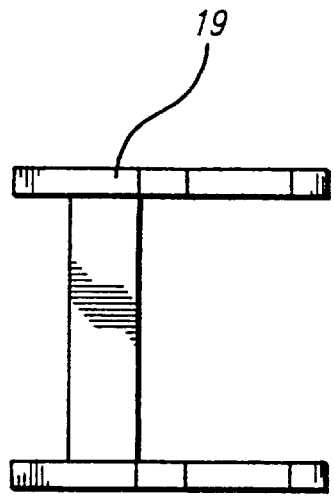
FIG. 11B shows a bottom view of the latch operator engager.
Figure 11A:
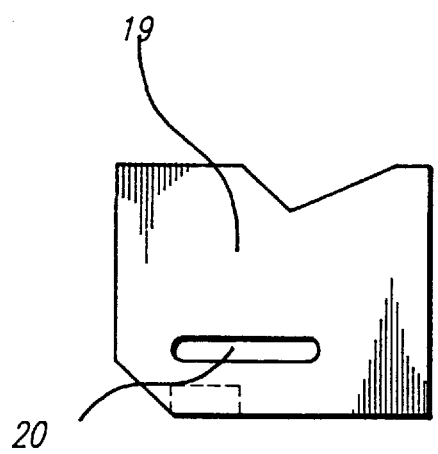
FIG. 11A shows a side view of the latch operator engager.
Figure 11C:
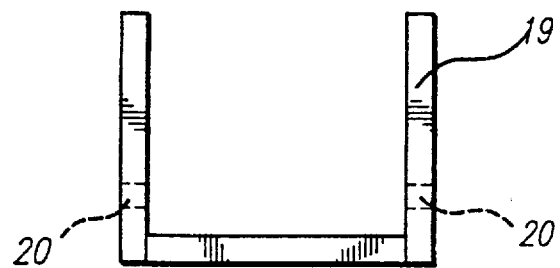
FIG. 11C shows a front view of the latch operator engager.
Figure 12:
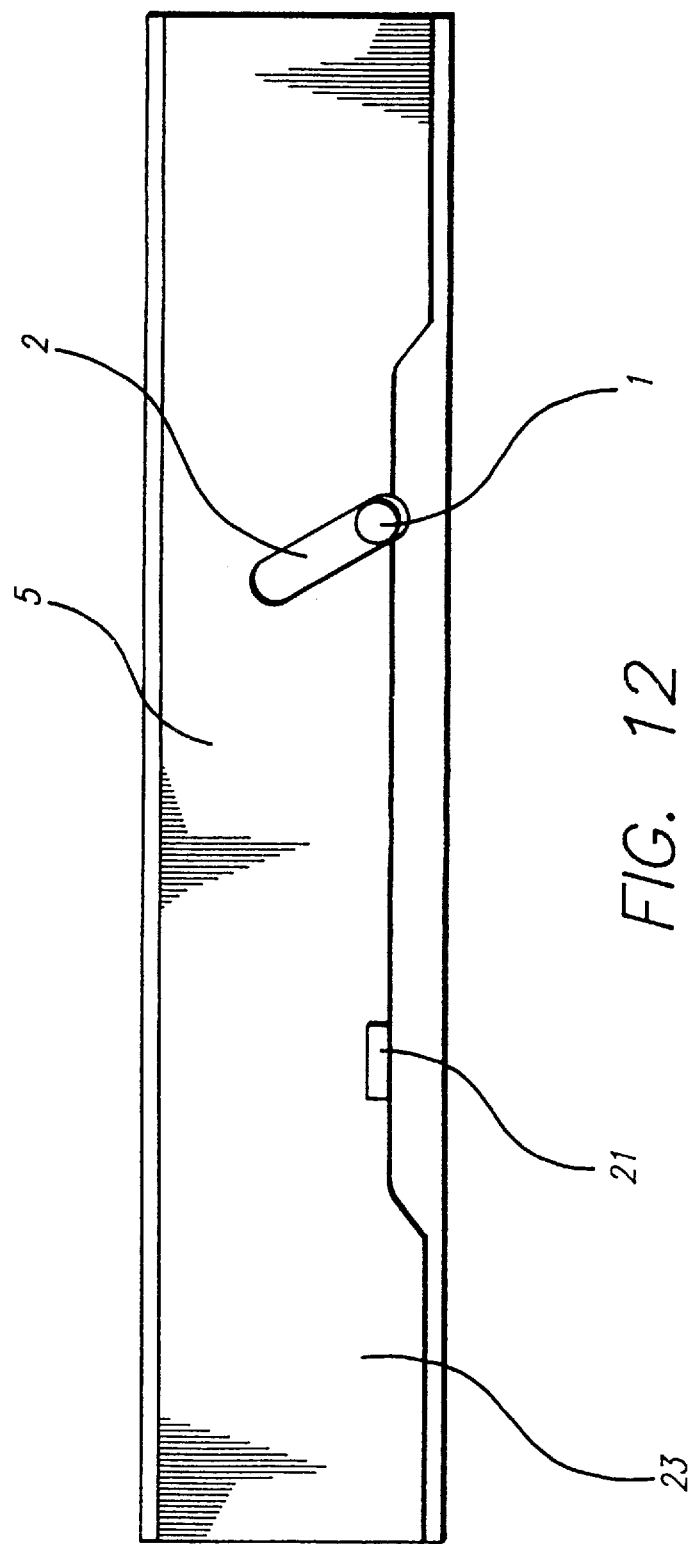
FIG. 12 shows the side view of the top rail.
Figure 13:
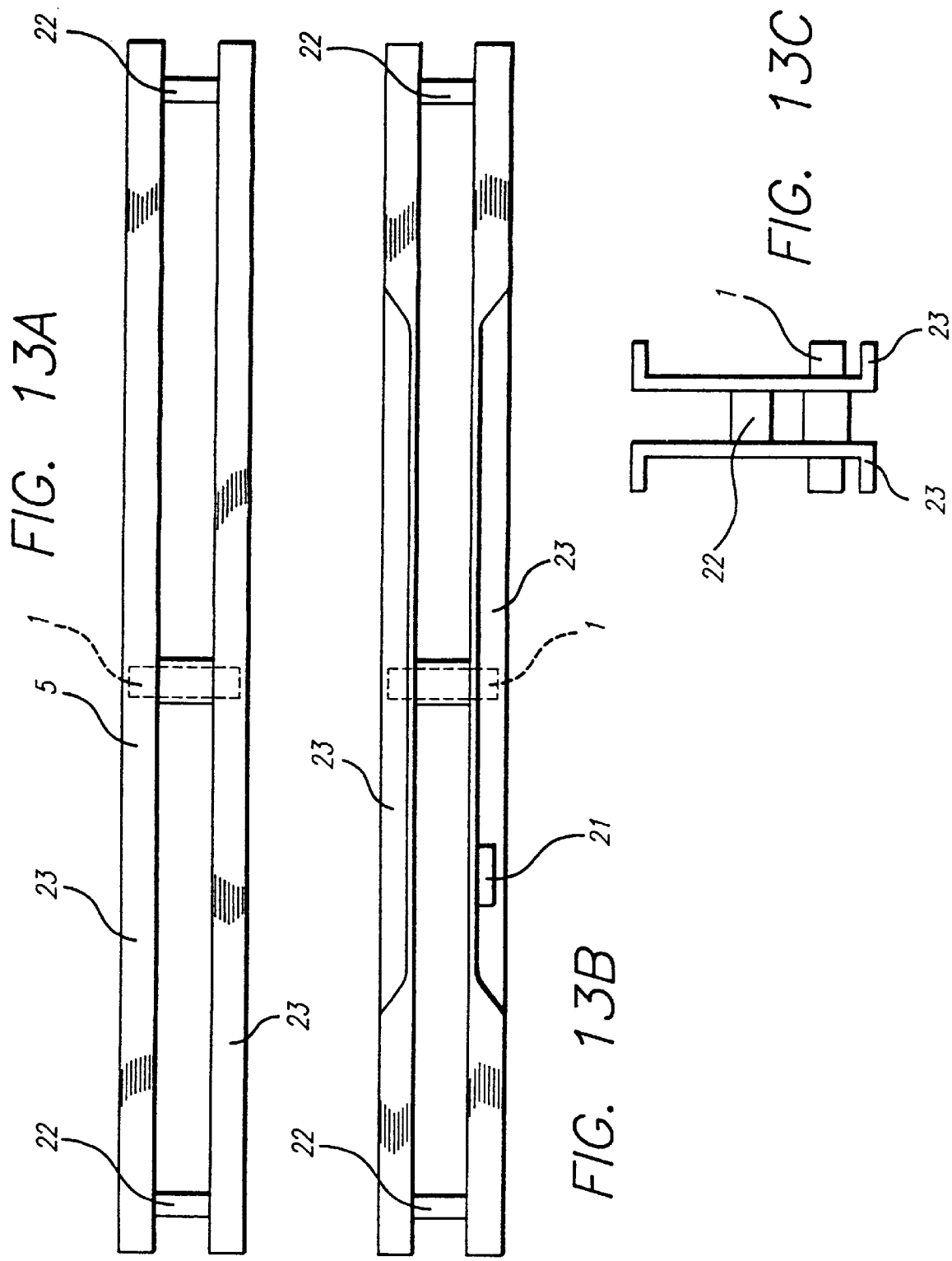
FIG. 13A shows a top view of the top rail.
FIG. 13B shows a bottom view of the top rail.
FIG. 13C shows a end view of the top rail.

FIGS. 11A, 11B, and 11C show the latch operator engager. The latch operator engager is fixed on the shaft 18 through the slots 20.

FIGS. 12, 13A, 13B, and 13C show the top rail 5. The top rail 5 consists of two "C" shaped rails 23 connected through two supports 22. The top rail has a latch pin slot 2 for holding the latch pin 1. The top rail also has a tab 21 for engaging the latch operator engager 19.

FIG. 14 shows section C of FIG. 1. In this view the lock-out rail 15 is shown above the horizontal top enclosure base 31. Also visible is the rocker arm 9 within the notch 33, the vertical supports 29, and the lock-out rail rack 8.

Figure 15:
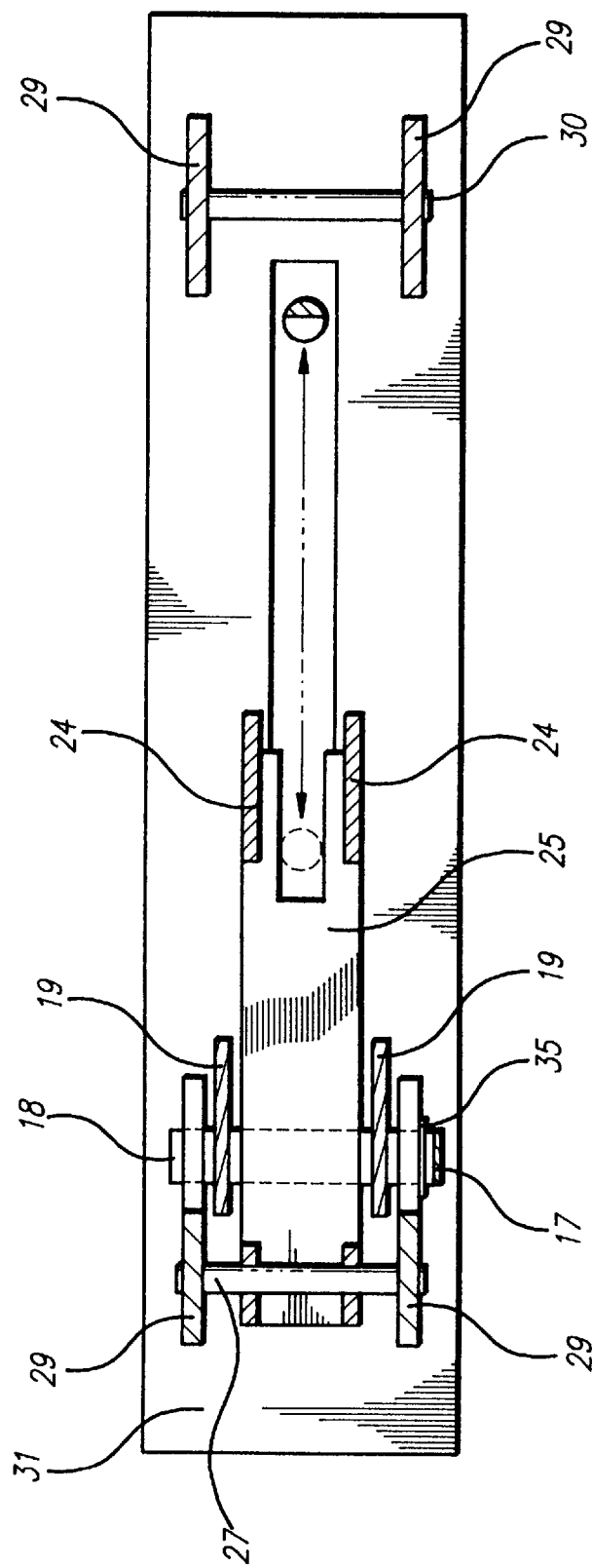
FIG. 15 shows cross section B of the horizontal top enclosure shown in FIG. 1.

FIG. 15 shows section B of FIG. 1. In this view the components comprising the means for rotating the latch operator are shown: the latch operator engager 19, shaft 18, handle 17, latch operator axle 27, top rail support rod 30. The latch operator is shown comprising the vertical side portions 24 and the connector 25.

Figure 16:
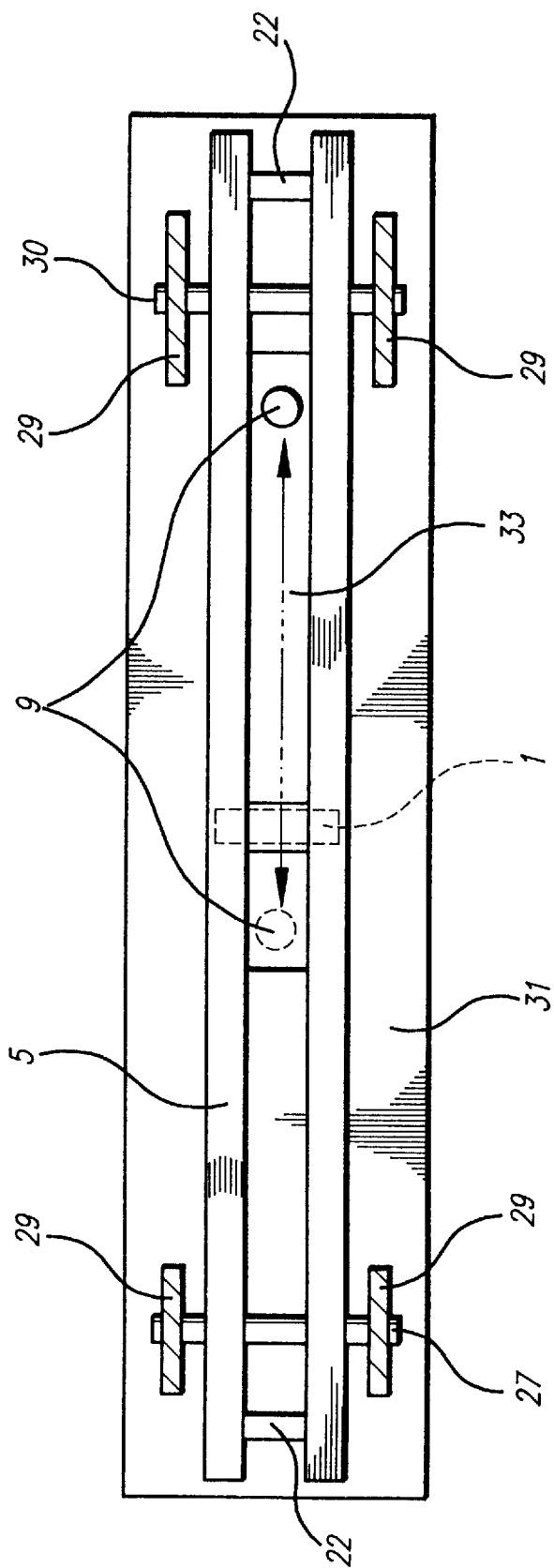
FIG. 16 shows cross section A of the horizontal top enclosure shown in FIG. 1.

FIG. 16 shows section A of FIG. 1. The top rail is shown in this section slidably resting on the latch operator axle 27 and the top rail support rod 30. The slot 34 in the horizontal top enclosure base 31 permitting the free rotation of the rocker arm 9 is shown.

Figure 17:
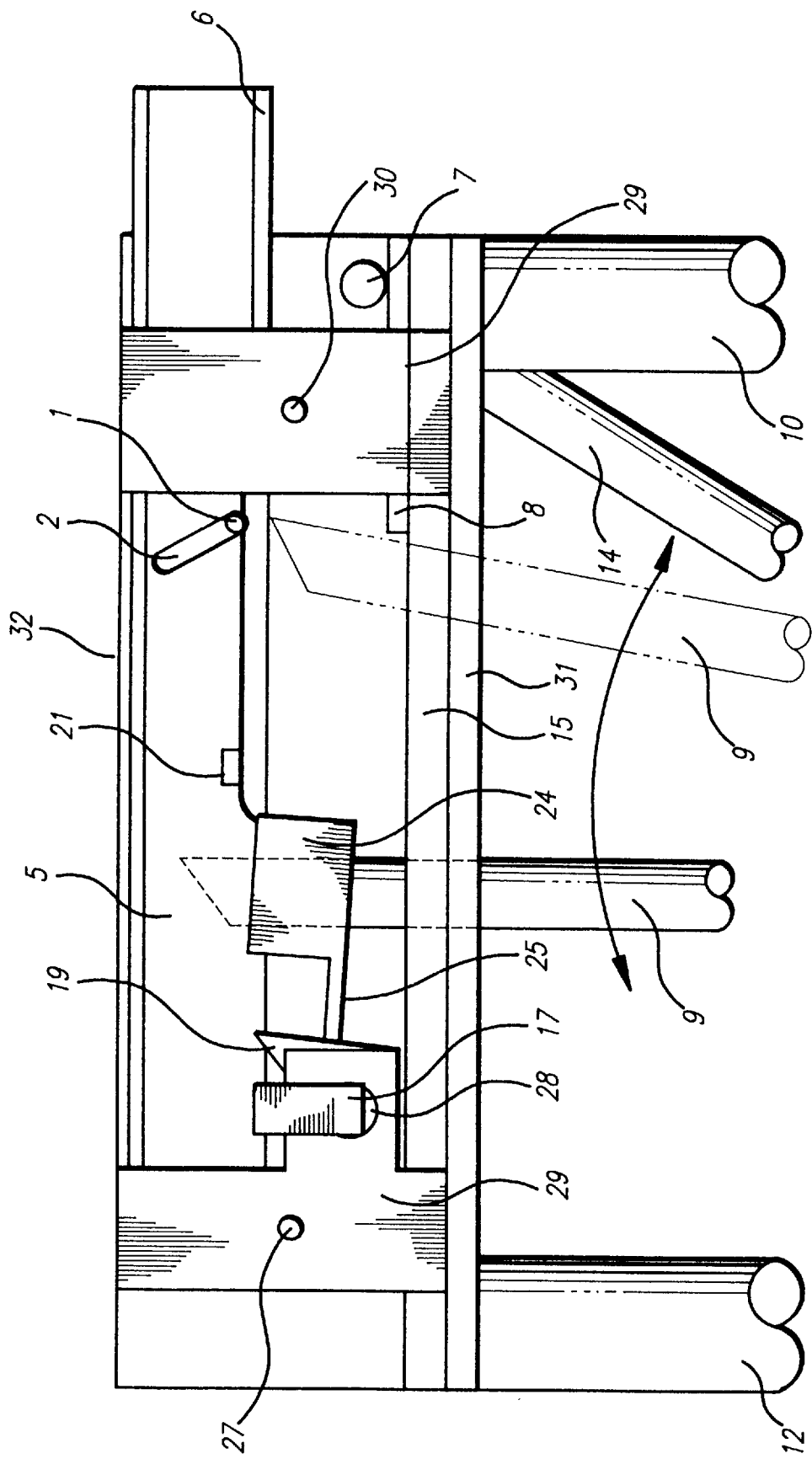
FIG. 17 shows the top rail in the free feed position.

In FIG. 17, the pinion gear 7 engages the top rail rack 6 which is attached to the top rail 5. The pinion gear 7 rotates in a counter-clockwise motion moving the top rail 5 horizontally to the left within the upper inner portion of the horizontal top enclosure 32. The top rail 5 is shown here in the "free feed position." This is the position where the top rail 5 has been moved far enough to the left such that the latch pin 1 no longer obstructs the free rotation of the rocker arm 9.

Figure 18:
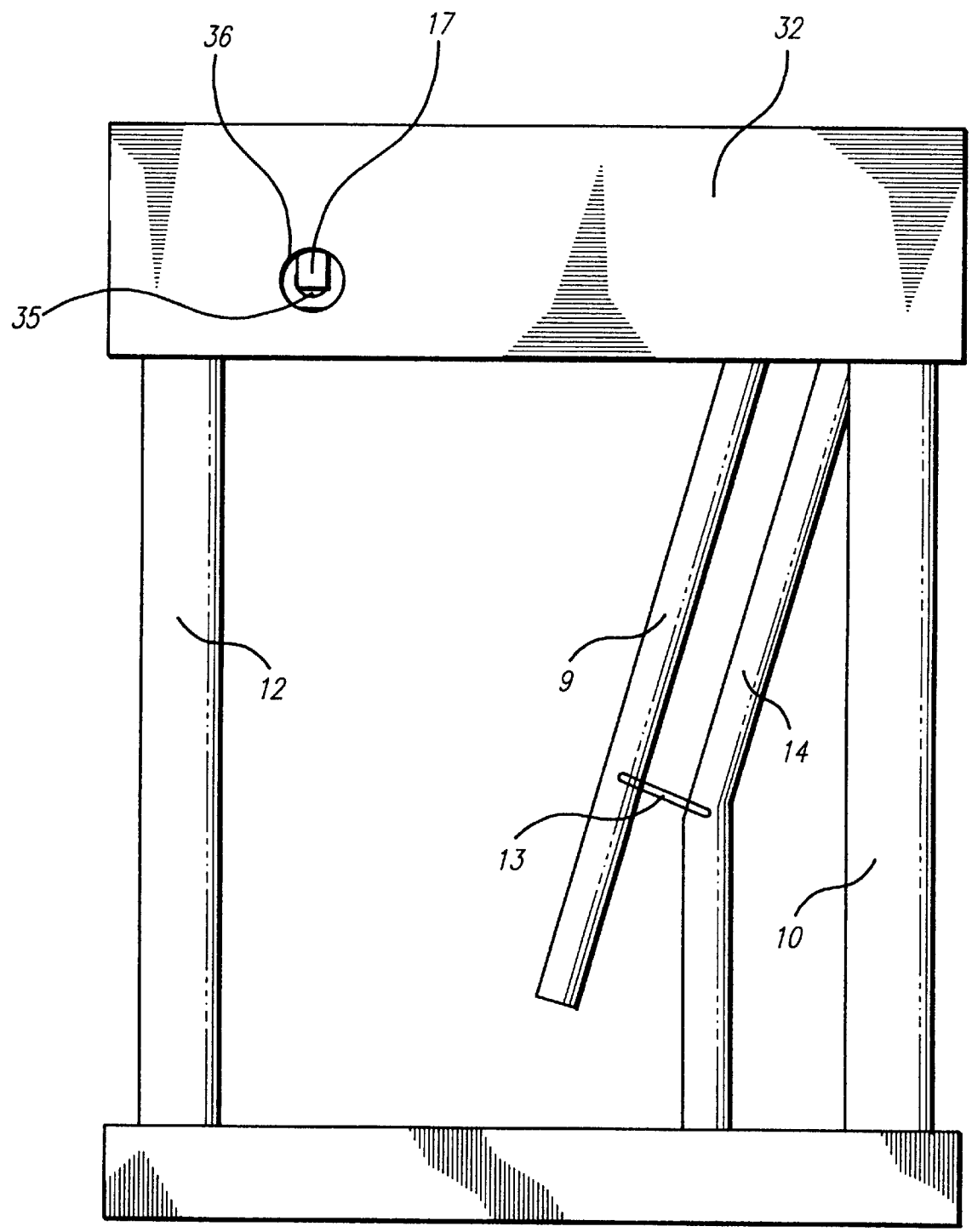
FIG. 18 shows a side view of the invention with the horizontal top enclosure in place.

FIG. 18 shows the cattle stanchion as it appears with the horizontal top enclosure 32 covering the device. The hole 36 permits an operator to access the handle 17.

I claim:

1. A cattle stanchion, comprising:
   A. a frame comprising:
      1. a horizontal top enclosure having upper and lower inner portions,
      2. a horizontal bottom frame means, and
      3. vertical brace means connecting the horizontal top enclosure and the horizontal bottom frame means;
   B. animal control means comprising:
      1. a support bar having upper and lower ends,
      2. a rocker arm having upper and lower ends,
      3. mounting means for pivotally mounting said rocker arm on said support bar whereby said rocker arm is pivoting between a first position and a second position,
      4. means for connecting the upper end of said support bar to the horizontal top enclosure, and
      5. means for connecting the lower end of said support bar to the horizontal bottom means;
   C. an enclosed latch means comprising:
      1. a latch having an open and a closed position,
      2. said latch being enclosed in the upper inner portion of said horizontal top enclosure,
      3. operating means for moving said latch between said open and said closed positions,
      4. whereby in the closed position said latch is engaging the upper end of said rocker arm when said rocker arm is in said second position thereby preventing said rocker arm from pivotally moving, and
      5. whereby in the open position said latch is not engaging the upper end of said rocker arm when said rocker arm is in said second position thereby permitting said rocker arm to pivot freely;
   D. an enclosed lockout means comprising:
      1. a lockout rail having a longitudinal notch,
      2. said lockout rail horizontally sliding in the lower inner portion of said horizontal top enclosure, and
      3. sliding means for moving said lockout rail whereby the longitudinal notch of said lockout rail is engaging the upper end of said rocker arm thereby preventing said rocker arm from pivotally moving when said sliding means is engaging said lockout rail.

2. A cattle stanchion as recited in claim 1, wherein said latch is comprised of:
   A. a top rail having a latch pin slot,
      1. said top rail being horizontally slidable in the upper inner portion of said horizontal top enclosure;
   B. a latch pin,
      1. said latch pin being slidably contained in said latch pin slot of said top rail,
      2. said latch pin sliding between an open and a closed position in said latch pin slot of said top rail.

3. A cattle stanchion as recited in claim 2, wherein said operating means for moving said latch between said open and said closed positions is comprised of:
   A. a latch operator,
      1. said latch operator being movably mounted to the upper inner portion of said horizontal top enclosure,
      2. said latch operator pivoting between a first and second position;
   B. pivoting means for moving said latch operator between said first and second positions,
      1. whereby said latch operator engages said latch pin moving said latch in between said open and said closed positions as said latch operator pivots between said first and said second positions when said latch operator is engaging said pivoting means.

4. A cattle stanchion as recited in claim 3, wherein said sliding means for moving said lockout rail is comprised of:
   A. a rack,
      1. said rack being fixed to said lockout rail;
   B. a pinion gear,
      1. said pinion gear engaging said rack;
   C. rotating means for turning said pinion gear.

5. A cattle stanchion as recited in claim 3, wherein said pivoting means for moving said latch operator between said first and second positions is comprised of:
   A. a handle;
   B. a shaft;
   C. a circular weather guard;
   D. a shaft holder; and
   E. a latch operator engager;
      1. said handle is attached to said shaft which is attached to said latch operator engager,
      2. said shaft pivots within said shaft holder,
      3. said circular weather guard is attached to said shaft between said handle and said latch operator engager whereby a snow or a freezing rain is prevented by the circular weather guard from interfering with the operation of said shaft, said shaft holder, and said latch operator engager,
      4. whereby a person can rotate said handle between said first and said second positions thereby rotating said latch operator engager between said first and said second positions.

6. A cattle stanchion as recited in claim 5, wherein said latch operator is comprised of:

A. a vertical side portion for engaging said latch pin;

B. a connector having first and second ends;

C. a latch operator axle attached to said top horizontal enclosure, said connector is attached to said latch operator axle, said vertical side portion is attached to the first end of said connector, whereby said person can rotate said handle into said second position, thereby rotating said latch operator engager engaging said connector, thereby raising said vertical side portion engaging said latch pin, raising said latch pin in said latch pin slot.

7. A cattle stanchion as recited in claim 6, wherein said connector is comprised of a thin metal strip, whereby said thin metal strip will bend under force when said latch operator engager is rotated into said second position and said rocker arm mechanically holds said latch pin in a fixed position thereby holding said vertical side portion of said latch operator engaged by said latch pin in a fixed position when a cow leans against said rocker arm, whereby when said cow ceases to lean against said rocker arm, said rocker arm ceases to mechanically fix said latch pin in said latch pin slot thereby enabling said latch pin to slide freely within said latch pin slot, thereby releasing said vertical side portion of said latch operator from a fixed position enabling said thin metal strip to raise said latch pin within said latch pin slot.

* * * * *